3,134,279
ROLLING MILLS
Raymond Bernard Sims, Sheffield, and James Arthur Harrison, Brimington Common, Chesterfield, England, assignors to Davy and United Engineering Company Limited, Sheffield, England
Filed June 4, 1962, Ser. No. 199,897
7 Claims. (Cl. 80—54)

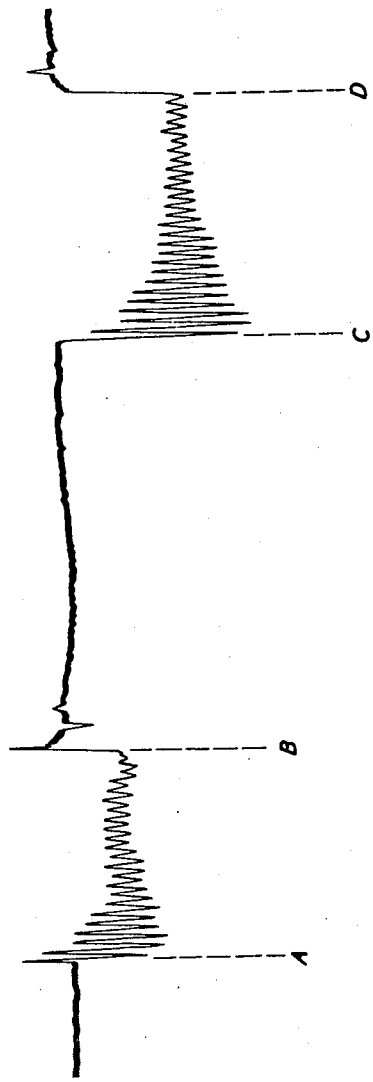
FIG. II.

This invention relates to rolling mills and is particularly concerned with, although not limited to, single-stand and multi-stand cold-rolling mills for producing very thin strips, for example strips for subsequent tinning to form tinplate. Because of the thinness of the strip, such cold-rolling mills are operated at high speeds; however, the speed of operation of such mills is normally below the potential maximum, because at very high speeds, the strip tends to become scratched. Such scratching gives an unsightly appearance to the strip, and also interferes with the subsequent deposition of the tin so that the strip may not be properly protected against corrosion. Thus, not only does scratching cause such mills to be operated at uneconomic low speeds, but the final product may be unusable.

We have discovered that scratching of the strip is caused by unequal torques being transmitted to and by the two work rolls of a mill, because of unequal lubrication on the two sides of the strip. Although the two work rolls are normally driven at accurately equal speeds, dissimilar lubrication at the two sides of the strip results in unequal torques being transmitted to and by the two work rolls, with the result that the strip is reduced unequally on its two sides, and either slip occurs between at least one strip surface and its contacting work roll, or dissimilar amounts of slip occur at the surfaces of the two work rolls.

In accordance with one aspect of the present invention, we therefore provide a method of controlling a rolling mill to reduce scratching of the work, in which the difference between the torques transmitted respectively to the two work rolls is detected, and the lubrication for the two sides of the work is adjusted to reduce this difference towards zero. As the torques transmitted to the two work rolls are brought towards parity, slip between the work surfaces and the rolls tends to reduce, with a corresponding reduction in the scratching of the work.

For the above mentioned method, the invention provides, according to another aspect, for each roll of a mill stand, a self-contained or substantially self-contained torque detector which is adapted to be carried by a part of the roll drive, to be responsive to the torque transmitted to the roll, and to transmit at radio frequency torque-representing signals to a receiver mounted independently of the roll and the roll drive and not directly connected to the detector. In this way, the provision of slip-rings and the like is avoided, except in that they may, if desired, be employed to connect a power supply to the equipment carried, according to the invention, by the said part of the roll drive, and, by the use of transistors and like miniaturization, each detector may be made so light and compact as to be carried on the corresponding fast-rotating roll drive without danger.

The received signals representing the torques transmitted to the two work rolls may be applied to a common indicator to indicate the difference between the torques. This indicator may be used to enable the lubrication of one or both sides of the strip to be so adjusted, either manually or automatically, as to maintain the torques substantially equal.

The invention will be more readily understood by way of example from the following description of a torque converter and associated apparatus in accordance therewith, and the arrangement of the torque converter on a mill, reference being made to the accompanying drawings of which:

Figure 1:
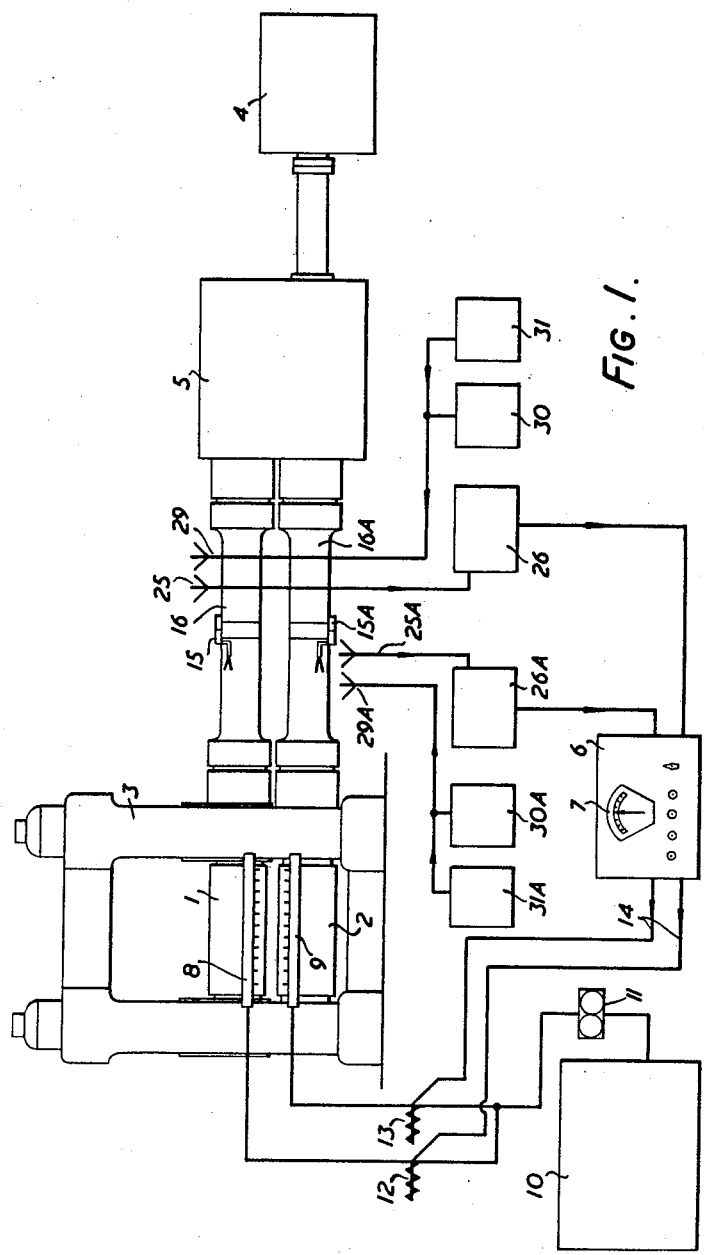
FIGURE 1 illustrates schematically a rolling mill stand and the lubrication control system therefor.

The two work rolls 1, 2 of the rolling mill stand 3 are driven at constant speed from a single motor 4 through a pinion stand 5 comprising two large and equal intermeshing gears coupled to the work rolls 1, 2 through driving spindles 16, 16A. Each driving spindle carries a self-contained torque detector 15, 15A constituted by a pattern of strain gauges arranged to be responsive to only the shear stress in the spindle. The output from each strain gauge, representing the torque, is applied to an associated small radio-frequency transmitter, forming part of the detector and carried on the spindle. The transmitter employs transistors and is generally miniaturized so that it is only about four inches by two inches by one inch and can be safely carried on the fast-rotating spindle. Small batteries for energizing the transmitter and the strain-gauge network are also carried on the spindle. A stationary receiving aerial 25, 25A is located adjacent to each spindle 16, 16A, in close proximity to the transmitter, and picks up the radio-frequency torque signals from the torque converter and applies them to respective receivers 26, 26A.

As indicated, there is a similar detector and receiver for each of the two drive spindles 16, 16A, and the torque-representing signals from the receivers 26, 26A are compared in a circuit 6 and the difference between the torques may be displayed on a centre-zero meter 7. Oil is sprayed on to the top and bottom surfaces of the strip passing between the rolls 1, 2 by two spray devices 8, 9 respectively. These devices 8, 9 are fed from an oil tank 10 by a pump 11 and through two control valves 12, 13 which control the flow to the flow devices 8, 9 respectively. The mill operator can observe the indications of the meter 7 and control the valves 12, 13 and hence the flow of mill lubricant to the top and bottom of the strip so as to maintain continuously the meter 7 at its centre zero position and therefore the torque carried by the spindles 16, 16A approximately equal. Thus, if the meter 7 indicates that the top mill spindle 16 carries more torque than the bottom spindle 16A, the flow of mill lubricant is increased to the top spray device 8 and/or decreased to the bottom spray device 9.

Alternatively, as shown, the torque signals from the two receivers 26, 26A may be compared as before in the circuit 6 and signals differentially representing the difference in torques, are applied on lines 14 to control automatically the valves 12, 13 and hence the flow of lubricant to the two sides of the strip in order to maintain the torques transmitted to the two rolls 1, 2 equal.

Figure 2:
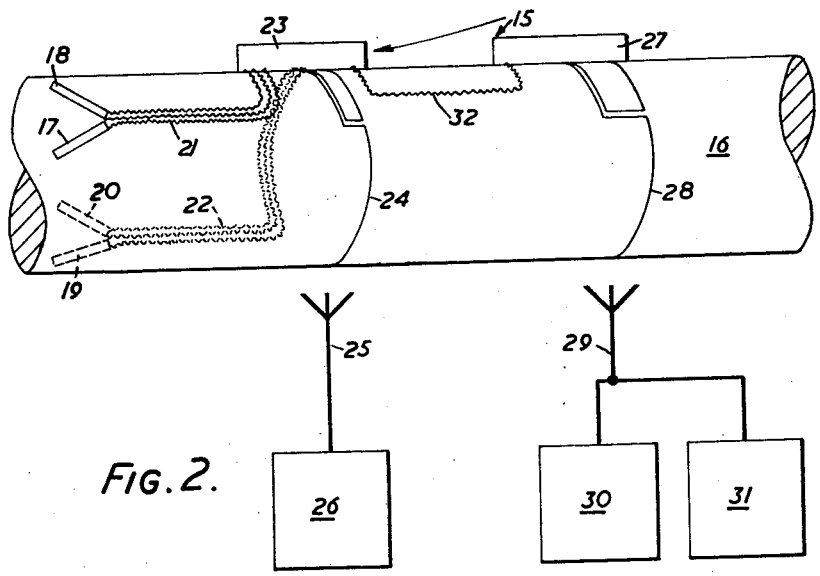
FIGURE 2 is a drawing showing both the general arrangement of a torque detector mounted upon the driving spindle of a roll of the mill stand for rotation with the spindle, and also showing the general arrangement of associated stationary apparatus.

FIGURE 2 shows in greater detail the torque detector 15 of one of the spindle 16, it being understood that the arrangement on the other spindle 16A is similar. In FIGURE 2, the four resistance-strain-gauges of the resistance-strain-gauge bridge are shown mounted upon the spindle 16 at 17, 18, 19 and 20 respectively. The strain gauges 17–20 are, as may be seen from FIGURE 2, arranged in the classical chevron pattern, one pair of strain gauges 17 and 18 being mounted upon the spindle 16 in the form of a V and diametrically opposite to the similarly arranged other pair of strain gauges 19 and 20, the pairs of strain gauges being respectively connected, as indicated, by cabling 21 and 22 to the miniaturized R.F. transmitter which is indicated at 23.

The output of the R.F. transmitter 23 feeds an aerial 24 which encircles the spindle 16. The corresponding receiving aerial 25, which is stationary, is located adjacent to the aerial 24 and feeds the receiving apparatus 26. The receiving aerial 25 may be located a few inches away from the spindle 16.

Electrical power both for the R.F. transmitter 23 and also for the energization of the resistance-strain-gauge bridge constituted by the strain gauges 17–20, is supplied from a power-supply unit 27 which is connected by cabling 32 to the R.F. transmitter 23 and the strain-gauge bridge. The power-supply unit 27 includes two 6-volt batteries and also includes apparatus, including two relays by means of which, respectively, the batteries can be disconnected when they are not required, in order to conserve them, and a calibrating resistance can be inserted in parallel with one arm of the strain-gauge bridge. R.F. signals for operating these two relays are received by an aerial 28 which encircles the spindle 16 and which receives R.F. signals from a transmitting aerial 29 located, similarly to the aerial 25, adjacent to the spindle 16; the aerial 29 is fed by two transmitters 30 and 31 which are respectively arranged to permit remote operation of the two relays included in the unit 27. In FIGURE 1, the various units for the spindle 16A are given the same reference numerals as those for spindle 16, but with the suffix A.

Figure 3:
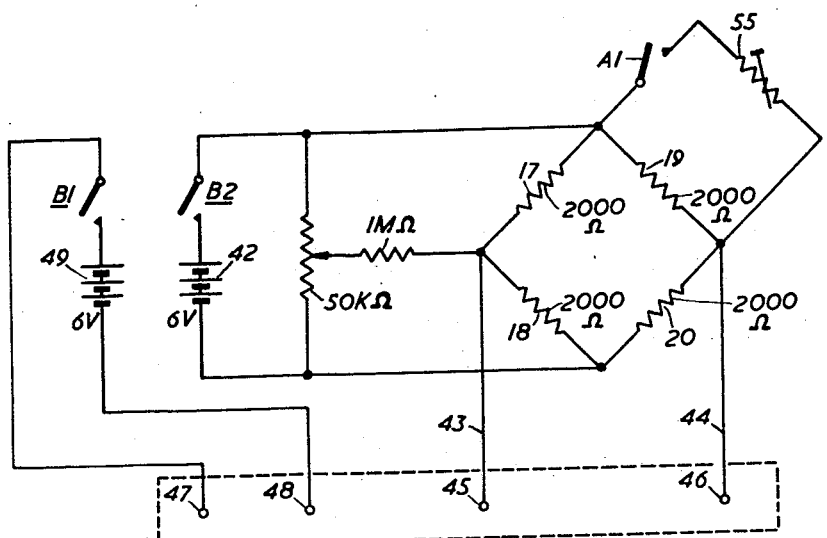
FIGURE 3 is a circuit diagram showing the resistance-strain-gauge bridge, and the batteries which form a part of the torque detector mounted upon the driving spindle.
Figure 4:
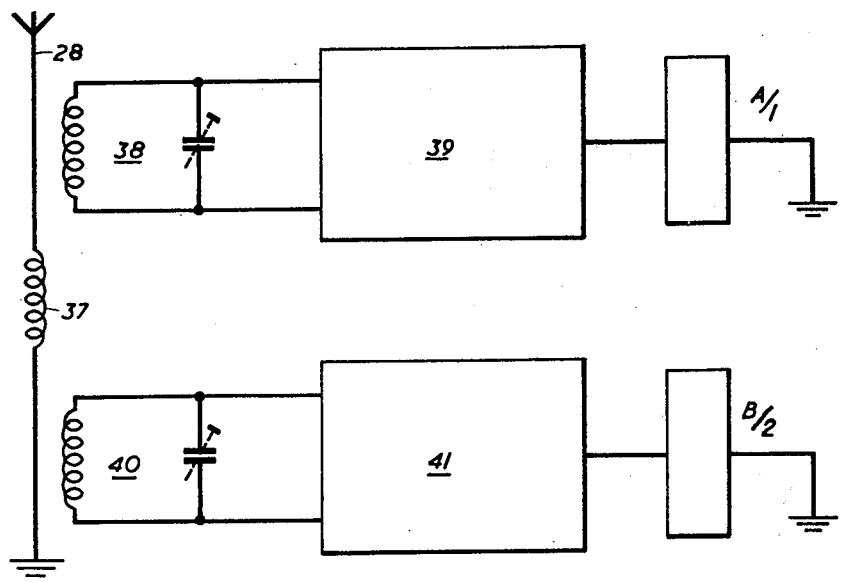
FIGURE 4 is a part-schematic circuit diagram showing the arrangement of certain receiving equipment which also forms a part of the torque detector mounted upon the driving spindle.

FIGURE 3 is a circuit diagram showing the arrangement of the strain gauges 17–20 in a resistance-strain-gauge bridge circuit, and the connections to the two 6-volt batteries 42, 49, all of this apparatus being carried by the spindle 16. FIGURE 4 is a part-schematic circuit diagram showing the apparatus which is included within the power-supply unit 27, which receives R.F. signals from the aerial 28 for operation of the two relays A, B, referred to above.

When it is required to operate relay A, the R.F. transmitter 30 (FIGURE 2) is energized to transmit an R.F. signal of appropriate frequency from the aerial 29; this signal is received by the aerial 28 (FIGURES 2 and 4) which (FIGURE 4) is connected to one terminal of a winding 37 the other terminal of which is connected to earth. For apparatus mounted upon the spindle 16, electrical connections shown as being made to earth, are actually made to the spindle 16 itself.

Referring to FIGURE 4, the R.F. signal transmitted from the transmitter 30 passes from the winding 37 to a tuned circuit 38 which is arranged to resonate at the frequency of the transmitter 30; the output from the tuned circuit 38 passes to a unit 39, wherein, by means of appropriate transistor circuits, the output of the tuned circuit 38 is suitably detected and amplified and applied to relay A which is thus energized on the reception by the aerial 28 of the R.F. signal from the transmitter 30.

A second transmitter 31, the output of which is also connected to the aerial 29, is arranged to transmit when required a second R.F. signal which has a frequency differing from that of transmitter 30 and which, similarly, by means of a second tuned circuit 40 and a unit 41 similar to the unit 39 is arranged to operate the relay B as and when required.

Reverting to FIGURE 3, one pair of corners of the strain-gauge bridge is connected, by way of a normally open contact B2 of the relay B, to battery 42. The other pair of corners of the bridge is connected, by means of wires 43 and 44, to the input terminals 45 and 46 of a modulator-amplifier which will be later described with reference to FIGURE 6.

Figure 6:
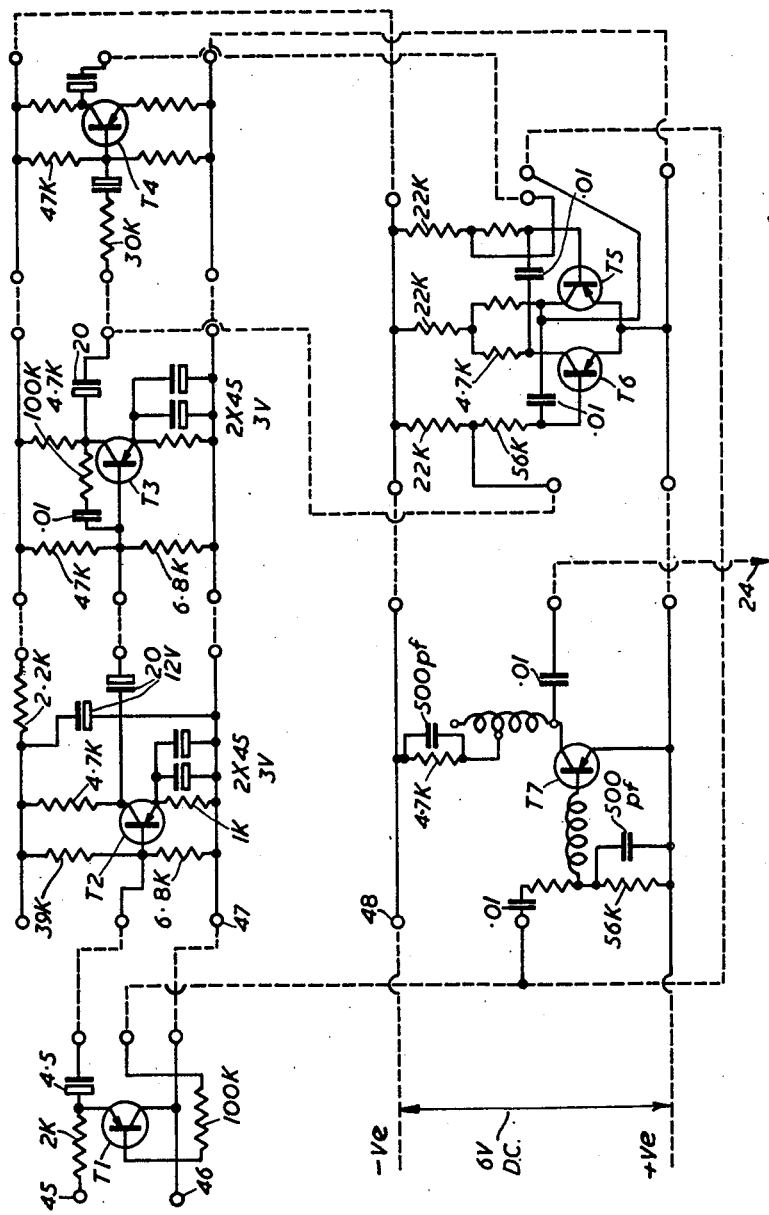
FIGURE 6 is a circuit diagram of the transmitter unit which is mounted upon the driving spindle and which forms a part of the torque detector.

As shown in FIGURE 3, the battery terminals 47 and 48 of the unit of FIGURE 6 are connected, by way of the second normally open contact B1 of relay B, to battery 49.

One of the resistance strain gauges 19 is shown in FIGURE 3 as shunted by a pre-set variable resistance 55 connected in series with the normally open contact A1 of relay A. When relay A is operated in response to energization of the transmitter 30 (FIGURE 2), the contact A1 closes to connect the resistance 55 in parallel with the strain gauge 18; the value of the resistance 55 is so chosen that closure of contact A1 unbalances the strain-gauge bridge by a predetermined amount corresponding to the apparent transmission of a predetermined torque by the spindle 16 to the corresponding work roll of the mill; thus, during operation of the torque detector, and while the spindle 16 is rotating, relay A can be operated at any time, in order to check the calibration of the complete torque-measuring apparatus and/or merely to check that this apparatus is functioning correctly. Of course, it is preferable to so check the calibration either with the spindle 16 rotating but transmitting zero torque, or with the spindle 16 stationary; however, in principle, it is possible to check the calibration of the apparatus while the spindle 16 is rotating and also transmitting torque.

Figure 5:
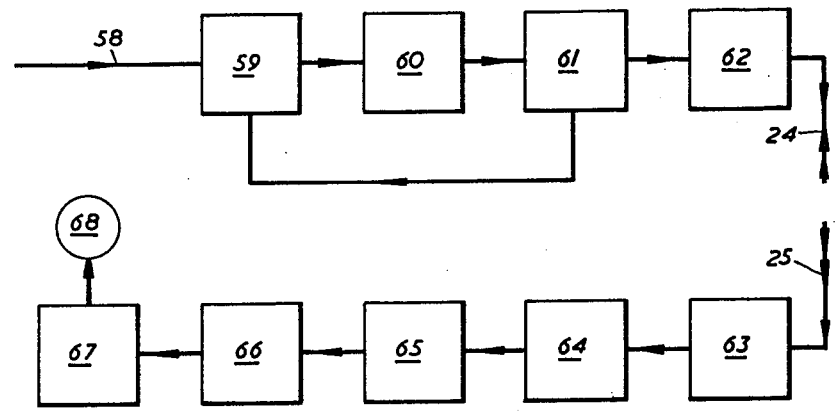
FIGURE 5 is a block diagram illustrating the operation of the torque detector.

FIGURE 5 is a block diagram illustrating the operation of one of the two torque detectors. The output signal from the resistance-strain-gauge bridge, representing the magnitude of the torque transmitted through the spindle 16 to the associated roll, is a D.C. signal which varies in accordance with the variation of the torque and which is of the order of millivolts; amplification of the D.C. signal must therefore be carried out, before it can be usefully employed. Referring to FIGURE 4, this D.C. signal is applied at 58 to the input of a chopper 59 the output of which is applied to the input of an A.C. amplifier 60. The output of the amplifier 60 is applied to the input of square-wave-generator apparatus 61 and is arranged to control the frequency of the square waves generated by the apparatus 61 such that the change of frequency of the square-wave output of the apparatus 61 is proportional to the magnitude of the D.C. signal on line 58 from the strain-gauge bridge. For convenience, the output of the square-wave-generator apparatus 61 is used, as indicated in FIGURE 5, as the control frequency of the chopper 59. The output of the apparatus 61 also controls the oscillation of a fixed-frequency R.F. oscillator 62 the output of which is applied to the aerial 24 (FIGURES 1 and 4). The output of the oscillator 62 is therefore an interrupted continuous wave (I.C.W.), the frequency of keying being directly proportional to the magnitude of the D.C. output signal from the strain-gauge bridge.

The signal received by the receiving aerial 25 (FIGURES 2 and 5) from the aerial 24 is (FIGURE 5) applied to the input of an R.F. amplifier 63 the output of which is applied to the input of a limiter-and-detector 64 the output of which is, in turn, applied to the input of an emitter-follower 65. The output of the unit 65 is applied to the input of a squarer 66 the output of which is applied in turn to the input of a meter circuit 67. The output of the meter circuit 67 is supplied, as will be described in greater detail below, to a centre-zero moving-coil meter 68 (the meter 7A, FIGURE 1), which is also supplied with the output from the receiver 26A (FIGURE 1).

The I.C.W. method of modulation, as described above, is preferably employed in order to permit relatively large changes in the amplitude of the carrier wave received by the aerial 25 without the accuracy of the system being affected; at the same time, the method employed permits the receiving apparatus to be maintained essentially simple. Moreover, since the apparatus is likely to be employed in areas where intense magnetic field exist, apparatus in which I.C.W. modulation is employed is subject to much less pick-up than would similar apparatus employing a straightforward conventional amplitude-modulated R.F. system.

FIGURE 6 is a circuit diagram of the R.F. transmitter 23 (FIGURE 2). The D.C. output from the strain-gauge bridge is applied to the terminals 45 and 46 (FIGURES 3 and 6) and is supplied to the chopper 59 (FIGURE 5), constituted by the transistor $T_1$ and associated circuit elements, which converts the D.C. output signal from the bridge into a square wave. The output from the chopper is supplied to the input of a 2-stage A.C. amplifier, which includes two transistors $T_2$ and $T_3$ and their associated circuit elements. The output of the A.C. amplifier is supplied to a circuit which includes a transistor $T_4$ and which converts the output of the A.C. amplifier into a push-pull electrical current which is supplied to a multivibrator circuit including two transistors $T_5$ and $T_6$ and so arranged that the push-pull current controls the frequency of the oscillation of the multivibrator in a linear manner.

The output of the multivibrator is the variable-frequency square wave referred to above in connection with FIGURE 5, and this square wave is used to key an H.F. oscillator which includes a transistor $T_7$. The output of this oscillator is supplied to the aerial 24 (FIGURES 2 and 6) and is in the form of an I.C.W. envelope at a fixed carrier frequency, the keying frequency being directly proportional to the D.C. output from the strain-gauge bridge.

The various stages of FIGURE 6 shown as connected one to another by chain line connections are made as separate units. For reliability and for stability, each transistor stage of the apparatus of FIGURE 6 is preferably encased in the epoxy resin sold under the registered trademark "Araldite"; after each stage has been so encased, the stages are interconnected, and then fitted into a protective case.

The outside dimensions of a transmitter unit of the form of FIGURE 6, which unit, it will be recalled, is mounted upon the fast-rotating spindle 16, if the unit is constructed as just mentioned, are 4 inches x 2 inches x 1 inch. The apparatus of FIGURE 6 consumes a current of 2 milliamps at 6 volts; in addition, suitable current must be supplied to the resistance-strain-gauge bridge from a battery 42 (FIGURE 2).

Figure 7:
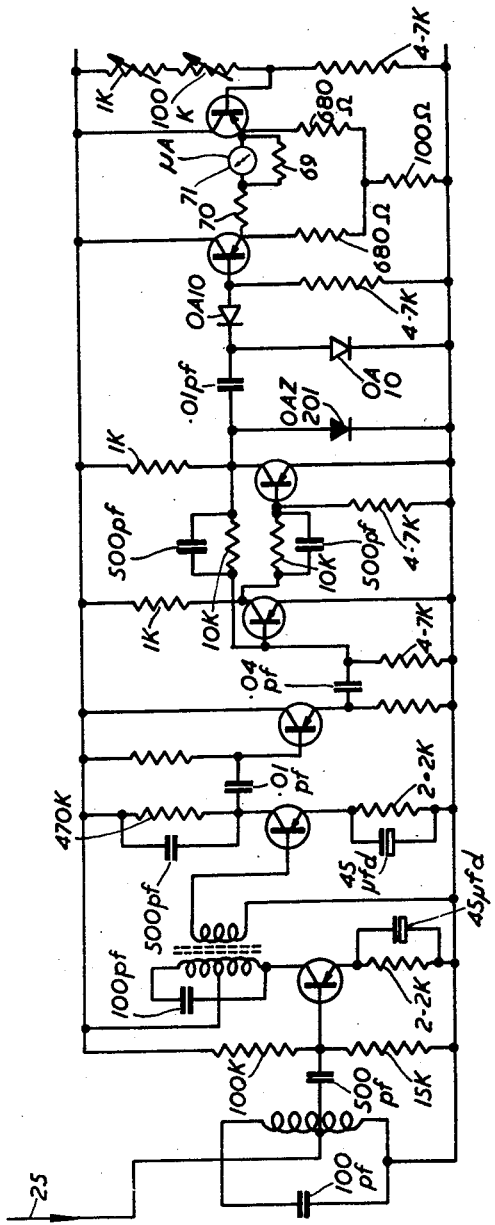
FIGURE 7 is a circuit diagram of the stationary receiving apparatus which is associated with the torque detector and which is located at a suitable position adjacent to the driving spindle.

FIGURE 7 is a circuit diagram of the receiving apparatus 26 (FIGURE 2) which was shown in block-diagram form in FIGURE 5. The circuit consists of a transistor receiver the output of which is differentiated and clipped, such that the average value of the voltage developed across the output load comprising resistances 69, 70 and the meter 71 is proportional to the frequency of the output signal from the transistor receiver. As shown in FIGURE 7, the voltage developed across the output load is employed to drive a current through the meter 71. In practice, a second receiving circuit of the form of that shown in FIGURE 7 is provided and is associated with the torque detector which is mounted upon the second spindle of the mill, which spindle connects the pinion stand to the second roll of the mill; the signal developed across the output load of that receiving circuit of the form of FIGURE 7 which is associated with the first torque detector is combined, in push-pull manner, with the similar signal developed across the output load of the receiving circuit 26A of the form of FIGURE 7 which is associated with the second torque detector 15A, the resulting difference current being arranged to flow through the centre-zero moving-coil meter 68 (FIGURE 4), the indication of which is thus a measure of the difference between the torques being transmitted through the two spindles which respectively drive the two rolls of the mill.

As described above, the mill operator observes the indication of the centre-zero meter and controls the flow of mill lubricant to the top and bottom of the strips so as to maintain the meter 68 continuously at its centre zero position and, therefore the torques carried by the spindles approximately equal.

Alternatively as described above, the difference of the two signals developed in the two output loads of the two receiving circuits of the form of FIGURE 7 may be arranged to constitute a control signal, which represent the difference between the two torques, and which may be employed to control automatically the flow of lubricant to the two sides of the strip so as to maintain equal the torques transmitted to the two rolls.

The difference signal just referred to may also be employed to drive a recorder which records the difference between two torques, and/or may be employed to record upon magnetic tape a signal representing the difference between the two torques.

Figure 8:
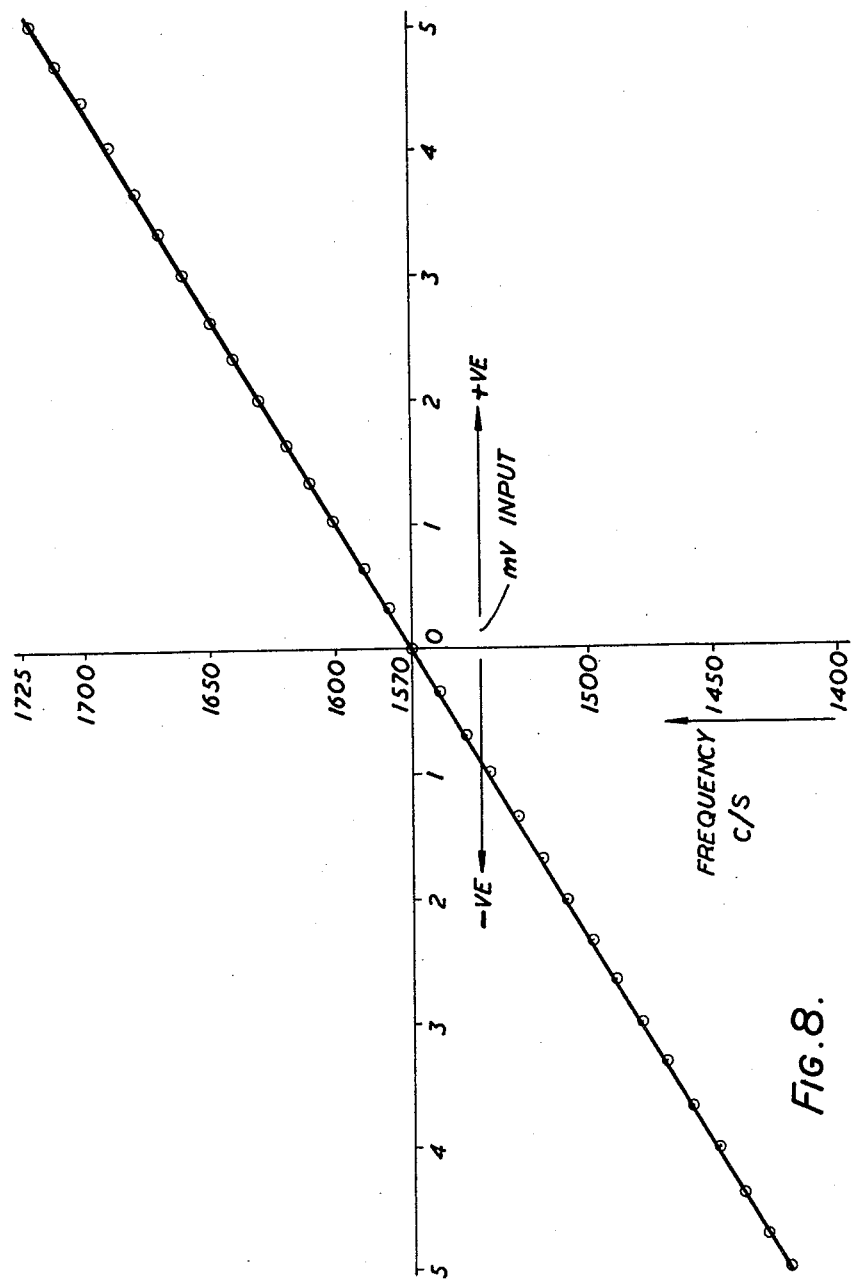
FIGURES 8, 9 and 10 are graphs, and FIGURE 11 a record, illustrating the operation of the torque meter.

FIGURE 8 is a graph illustrating the operation of the apparatus. As abscissa, there is plotted, in millivolts, the D.C. input signal to the chopper 59 (FIGURE 5), that is to say, the D.C. output from the resistance-strain-gauge bridge of one of the torque detectors; as ordinate there is plotted the frequency of the square-wave output from the square-wave generator 61 (FIGURE 5), that is to say the keying frequency of the R.F. fixed-frequency oscillator 62 (FIGURE 5). The linear relationship of the two can be clearly seen: the straight line has a slope of 30 cycles per second, per millivolt; the centre frequency is 1570 cycles per second.

Figure 9:
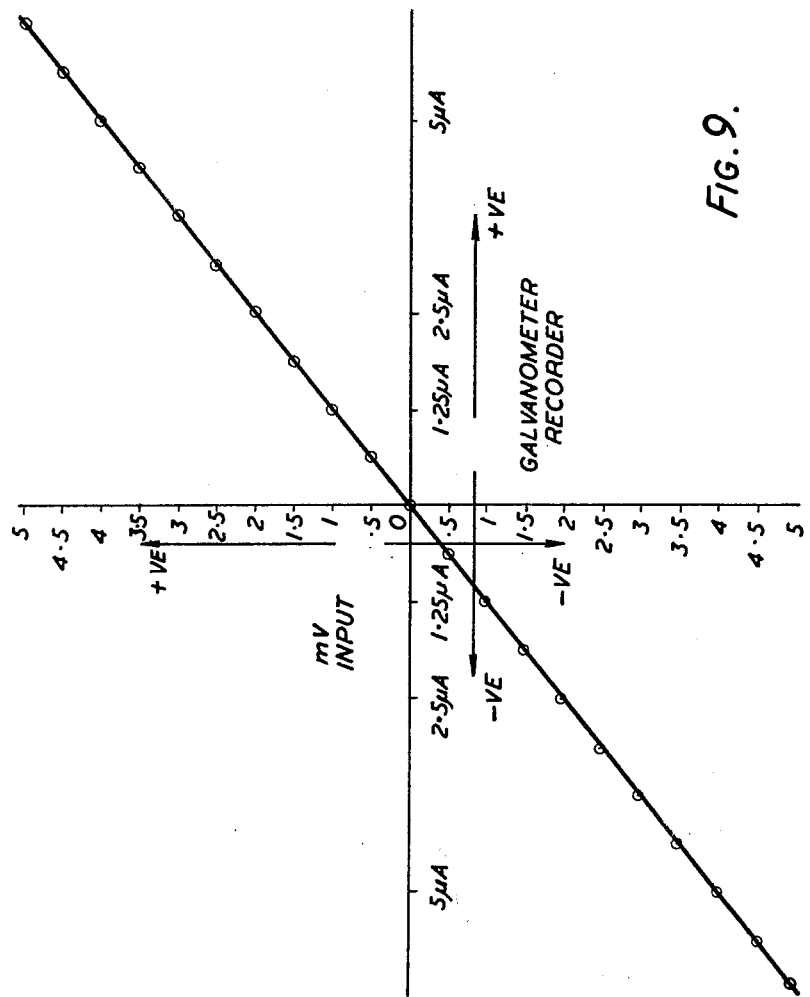

FIGURE 9 is a graph illustrating the high sensitivity of the apparatus. As ordinate there is plotted, in millivolts, the D.C. output signal from the resistance-strain-gauge bridge; as abscissa there is plotted, in microamps, the corresponding current which flows through the meter 67 of the receiving apparatus shown in FIGURE 7.

Reverting to FIGURE 6, the input characteristic impedance of the transmitter unit shown there is 7,000 ohms; the output characteristic impedance of the resistance-strain-gauge bridge is arranged to match this value.

Figure 10:
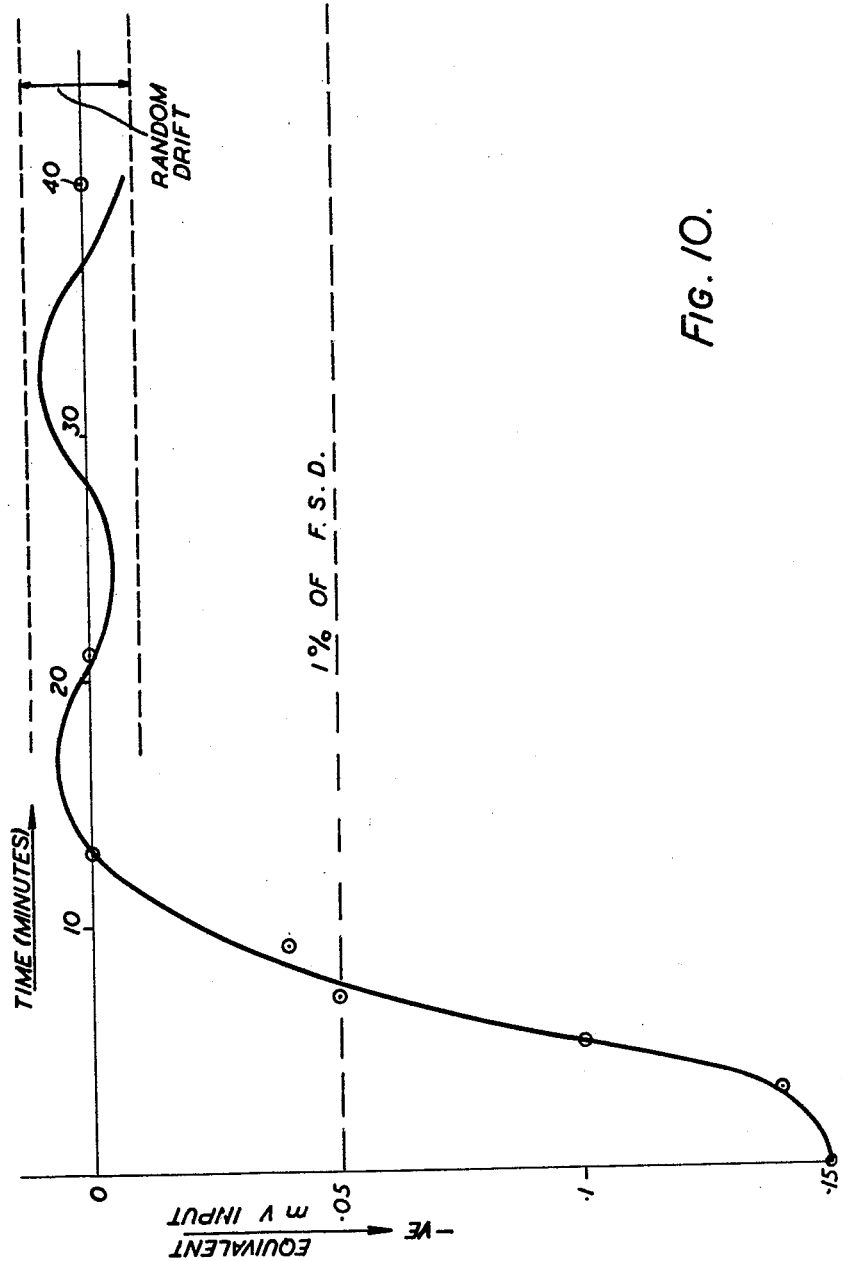

FIGURE 10 is a graph illustrating the drift in the zero of the apparatus, from the time when the apparatus is switched on, until the apparatus reaches its normal working temperature. As abscissa there is plotted, in minutes, the time which has expired after the apparatus has been switched on; as ordinate there is plotted the variation in the torque-representing output signal of the apparatus, expressed in terms of an equivalent D.C. input signal, in millivolts, from the resistance-strain-gauge bridge (it being assumed, of course, that the torque transmitted by the relevant spindle remains constant during the time interval concerned). Since it is important to conserve the electrical energy of the batteries 42 and 49 (FIGURE 3) carried by the spindle 16, the information given by the graph of FIGURE 9 is important. Referring to FIGURE 10, it will be seen that if, immediately after the apparatus has been switched on, it is used to measure the torque transmitted by the shaft 16, then the reading obtained may be in error by 3% of the full-scale deflection of the meter 71 (FIGURE 7), this full-scale deflection representing a D.C. output signal of 5 millivolts (see FIGURE 9) from the resistance-strain-gauge bridge. After the apparatus has been switched on for 7 minutes, this error is reduced to 1%; stable conditions are reached after the expiry of 9 minutes.

It will be recalled that the output signal from the resistance-strain-gauge bridge is, when the torque transmitted by the spindle 16 is varying, a D.C. signal of correspondingly varying amplitude and sign; the apparatus is designed to transmit information regarding frequency components of this varying D.C. signal, up to a maximum frequency of approximately 10 cycles per second. This maximum frequency has been found by experiment to be high enough to permit spindle torques to be measured satisfactorily; should a better frequency response be required, it would be necessary to improve the filtering arrangements of the receiving apparatus of FIGURE 7, since these constitute the limiting factor concerned.

Referring to FIGURE 7, it will be recalled that the electrical current flowing through the microammeter 71 is a measure of the torque transmitted by the spindle 16. If a recorder were substituted for the meter 71, a visual record of the variations in the torque transmitted by the spindle 16 could be obtained; such a record is shown in FIGURE 11.

FIGURE 11 is a record of the variation in the torque transmitted by one of the two spindles of a reversing rolling mill, while a billet is passed between the rolls of the mill, first in one direction, and then in the opposite direction. At the time A the billet was fed between the rolls, and at the time B the billet left the rolls.

The oscillations recorded between the times A and B represent torsional oscillations of the spindle concerned. At the time indicated by C, the billet was fed between the rolls in the reverse direction, and at the time indicated by D the billet finally left the mill; torsional oscillations of the spindle concerned also occurred between the times C and D. The peaks in the recorded torque which occurred immediately after the times B and D were due to the reversing of the drive motor of the mill.

Reverting to FIGURE 10, it may be seen that the long-term stability of the apparatus is good enough to permit the use of the apparatus to measure torques over long periods of time; at any time, of course, the calibration of the apparatus can be checked, as has been described above, by operation, while the shaft or shafts concerned are still rotating, of the appropriate relay or relays A.

It will be recalled that, with the arrangement which has been described, each spindle-mounted torque detector includes a power-supply unit 27 (FIGURE 2) which incorporates the two batteries 42 and 49 (FIGURE 3). If it is required to take measurements of spindle torque over a very long period of time such that the capacities of these batteries would be insufficient, then a slip-ring arrangement may be employed to supply D.C. electrical power to the spindle-torque detector, instead of the spindle-mounted batteries. For this purpose, a suitable slip-ring assembly may be constructed from two semi-cylindrical formers of laminated wood which are mounted together upon the spindle concerned and which are provided with inserts made from stainless-steel strip, the inserts serving as the slip-ring electrical contacts, and the two halves of the former being strapped together around the spindle concerned. It has been found that the drive spindles of rolling mills are subjected to considerable vibration, such that it was not practicable to employ the usual arrangement of brushes to engage the contacts formed by the stainless-steel-strip inserts. Instead of brushes, lengths of copper braid, extending from side-to-side of the spindle concerned, and held under tension by means of stiff springs, and arranged so as to rub upon the stainless-steel-strip inserts, have been found satisfactory.

In the arrangements which have been described, radio-frequency (R.F.) transmitters and receivers are employed to transmit signals to and from the rotating spindle or spindles 16. In a modification, the R.F. transmitters and receivers which have been described are replaced by transistorized very-high-frequency (V.H.F.) transmitters and receivers. This substitution permits the receiving apparatus 26 (FIGURE 1) and the transmitters 30 and 31 (FIGURE 1) to be located at considerable distances from the spindle 16, so that torque indications from one or a number of rolling mills could be transmitted to a central control station.

We claim:
1. A method of controlling a rolling mill to reduce scratching of the work, which comprises measuring the difference between the torques transmitted respectively to two opposed work rolls of the mill and applying lubrication to the two sides of the work which respectively contact said rolls in such a ratio as to reduce the measured difference towards zero.

2. An automatic control system for a rolling mill having a pair of work rolls, a drive for each work roll and lubrication means for individually lubricating the sides of the work which are contracted by the work rolls, said control system comprising torque detectors on the drive for each work roll of the mill, means responsive to the detectors for generating a signal representing the difference between the torques transmitted respectively to the two work rolls, means for varying the lubrication applied to at least one side of the work and means responsive to said signal for automatically controlling the lubrication varying means to maintain said torques substantially equal.

3. A control system according to claim 2 in which each torque responsive detector is a miniaturized substantially self-contained torque detector which is adapted to be carried by a part of the roll drive, and to be responsive to the torque transmitted to the roll, said control system also including transmitter means connected with the torque detector for transmitting at radio frequencies or very high frequencies torque-representing signals, and a receiver for picking up said signals mounted independently of the roll, said receiver being connected with the means for generating the difference signal.

4. A control system according to claim 3 in which each torque detector includes a strain gauge adapted to give a D.C. signal whose amplitude represents the torque, said control system also including means for modulating the pulse repetition rate of pulses forming said torque-representing signals, in accordance with the amplitudes of the D.C. signal.

5. A control system according to claim 3 in which each transmitting means includes a transmitting aerial arranged to encircle said part of the roll drive.

6. A control system according to claim 3 in which each torque detector includes a battery circuit including an aerial and a relay connected to said aerial so that a signal received by the aerial is operable to energize the relay to connect or disconnect the battery to the detector.

7. A control system according to claim 6 in which the battery circuit includes a further relay operable by a signal received by the aerial to energize means for checking the calibration of the complete torque measuring apparatus.

References Cited in the file of this patent
UNITED STATES PATENTS

| | | |
|---|---|---|
| 2,766,617 | Tyler et al. | Oct. 16, 1956 |
| 3,000,208 | Piazza | Sept. 19, 1961 |
| 3,078,747 | Pearson | Feb. 26, 1963 |